United States Patent Office 3,359,236
Patented Dec. 19, 1967

3,359,236
STRAIN FREE, LIGHT STABLE HALO-ACRYLATE POLYMERS AND METHOD OF PRODUCTION
Harry D. Anspon, Kansas City, Mo., assignor to General Aniline & Film Corporation, New York, N.Y., a corporation of Delaware
No Drawing. Filed Mar. 17, 1964, Ser. No. 352,667
12 Claims. (Cl. 260—45.95)

ABSTRACT OF THE DISCLOSURE

In the polymerization of methyl α-chloroacrylate in sheets, the inclusion in the monomer of a small amount, less than 0.25%, of a hydroxy benzophenone, such as 2,2'-dihydroxy-4,4'-dimethoxybenzophenone, and exposing the mixture in a mold to light which includes ultra-violet and longer radiation.

---

This invention relates to strain-free, light-stable halo-acrylate polymers and method of production. It relates particularly to transparent mass polymers of methyl α-chloroacrylate and to a method of producing such.

It is well known in the art that mass polymerization of methyl α-chloroacrylate can be effected by heating alone, or by incorporating a polymerization catalyst in the monomer, with a without heat and/or by irradiation of the monomer with ultra-violet light.

Processes of this general character have been described, for example, in U.S. Patents Nos. 2,576,821 and 2,683,704. These polymers have many uses, an important use being in windows, etc., of aircraft where clear vision and high strength are requisite. The polymer sheets are lighter in weight and generally stronger than glass.

In preparing transparent mass polymers of methyl α-chloroacrylate, particularly in forming sheets or other forms in which the optical clarity is important, polymerization by irradiating with ultra-violet light has an advantage over the other known methods in that it avoids introduction of catalysts and is not subject to the non-uniformity that frequently results from heating the monomer by conduction. Where heating is necessary to accomplish complete polymerization, it is difficult to avoid local overheating and resultant lack of uniformity, etc.

However, when mass polymerized sheets of polymethyl α-chloroacrylate are prepared by irradiating the monomer with ultra-violet light, the radiation being the effective polymerization force, examination of the polymer in polarized light usually reveals strain patterns, e.g., Maltese cross effects, and the like, outlined by bright birefringent areas. These are unacceptable for the uses mentioned above. When it is attempted to heat these sheets to softening temperature in order to shape them, e.g., to form windows, canopies, sight panels, etc., the strain patterns developed during polymerization will disappear or diminish. However, on heating, the surface of the sheet, though originally smooth, usually becomes dotted by depressions and protrusions presumably resulting from the release of the original internal strains in the polymer. The resulting sheets are then quite unsuitable for uses where an optically smooth surface is necessary, and can only be used for such purposes after costly grinding and polishing operations. These difficulties have greatly militated against successful commercialization of the halo-acrylate polymers for use in aircraft.

According to the present invention, it has now been discovered that incorporation in monomeric methyl α-chloroacrylate, preparatory to its mass polymerization, of suitable ultra-violet absorbing compound which dissolves in the monomer, prevents formation of strain patterns in the polymer sheet when mass polymerization is effected by irradiation with ultra-violet light. Moreover, the afore-mentioned local surface distortion of the resulting polymer does not occur when the polymer is heated to softening temperatures, e.g., for forming into special shapes or curing. As a result, mass polymerized polymethyl α-chloroacrylate sheets can now be used directly for purposes where an optically smooth surface as well as maximum transparency is required, even if they must be heated for shaping or the like.

It was known heretofore to incorporate ultra-violet absorbent compounds in certain kinds of transparent plastic or polymerized materials, as, for example, in the production of ultra-violet filter layers, and to effect such incorporation by adding the ultra-violet light absorbing compound to a monomer, prior and preparatory to its polymerization. However, the use of ultra-violet light to effect polymerization in such cases was ordinarily avoided since it naturally would be expected that absorption of such light by the incorporated actinic light absorbing compound, in the outer layers exposed to polymerizing irradiation, would prevent satisfactory polymerization of the interior layers. Polymerization was usually accomplished by heating, with the undesirable results already mentioned.

It has been found, according to the present invention, that the presence of certain suitable ultra-violet absorbing compounds in methyl α-chloroacrylate, when the monomer is to be irradiated by ultra-violet light for mass polymerization, moderates the process so as to avoid excessive or localized spontaneous rise in temperatures, but does not prevent the completion of effective polymerization by radiation and without substantial heat.

Polymerization of methyl α-chloroacrylate in sheets in accordance with this invention, involving inclusion of an ultra-violet absorbing compound in the monomer, can be effected by ultra-violet irradiation of the monomer in conventional sheet molds, i.e., between glass mold plates, the irradiation being applied from one or both sides of the mold. Casting in sheets, between glass plates for example, is a known technique, being described, for example, in U.S. Patent Nos. 2,817,878 and 2,848,753.

A significant improvement noted in the polymer as a result of inclusion of a suitable ultra-violet absorber in the monomer during polymerization, in accordance with this invention, lies in the improved resistance of the polymer to discoloration upon subsequent long exposure to sunlight or other sources of actinic radiation. Thus, it was found in the case of a sample sheet, polymerized according to the invention, that the color remained unchanged after 400 hours in a Fadeometer, even when examined edgewise. In the absence of an ultra-violet absorbing compound, noticeable darkening occurred on similar exposure of a control sample.

Preferred ultra-violet absorbing materials are soluble hydroxy aromatics, especially hydroxy benzophenones such as benzoyl resorcinol or n-hydroxy benzophenones where n has a value of 1 to 4. Of these, the n-hydroxy alkoxy benzophenones are specifically preferred, such as 2,2'-dihydroxy-4,4'-dimethoxy benzophenone or 2,2'-dihydroxy-4,4'-diethoxy benzophenone. Related materials such as 2,2',4,4'-tetrahydroxy benzophenones, 2,2',4-trihydroxy-4'-methoxy benzophenone, 2,2',4-trihydroxy-4'-ethoxy benzophenone, or 2-hydroxy-4-methoxy benzophenone and 2-hydroxy-4-ethoxy benzophenone may be used.

Our invention will be understood more fully from the following examples intended to illustrate but not limit the invention.

Example 1

Methyl-α-chloroacrylate monomer was steam distilled and then held at −35° C. for two hours to cause separation of moisture in the form of ice which was removed. Thereafter there was added to the monomer 0.05% by weight of an oily methylphenyl siloxane polymer to serve as a mold release agent, and 0.05% of 2,2'-dihydroxy-4,4'-dimethoxybenzophenone which serves as an ultra-violet absorbing compound. The resulting mixture of monomer and additives was poured into a mold comprising two sheets of plate glass 30" x 30" spaced apart ⅛" to provide a mold space. The plate edges were suitably enclosed, e.g., by a gasket or a strip of tape or similar edge seal, bridging the edges of the two plates. The contents in the mold were next exposed to the radiation of six fluorescent sunlamps (40 w., 110 v.) spaced about a foot from the upper plate of the mold. This exposure was continued for 142 hours. At the end of this period polymerization was found to be essentially complete. The mold was then placed in an oven for curing at 120° C. for twenty-four hours. A similar sheet, to be used as a control, was made in the same manner except that the ultra-violet absorbing component 2,2'-dihydroxy-4,4' - dimethoxybenzophenone was omitted. The finished polymer sheet, when examined under polarized light, showed no star patterns resulting from strain, while the control sheet was characterized by numerous strain patterns.

*Example 2*

Four samples of methyl α-chloroacrylate monomer were placed, respectively, in four dry, clean glass-stoppered bottles. To three of these samples are added, respectively, 0.5% of benzoyl resorcinol, 0.5% of sublimed benzoyl resorcinol, 0.1% of 2,2'-dihydroxy-4,4'-dimethoxybenzophenone and the fourth sample was used as a control. The four samples were exposed to daylight to effect polymerization. Observations were made carefully to determine the relative effects of the additives. The monomer containing the unpurified benzoyl resorcinol took the longest time to polymerize while that containing the purified benzoyl resorcinol set up the most rapidly of all the samples. In all four cases the polymers were exposed in a standard Fade-o-meter without any change in color.

*Example 3*

A mold formed of two 30 by 30 inch glass plates spaced ¼ inch apart was filled with methyl α-chloroacrylate monomer containing 0.01% by weight of 2,2'-dihydroxy-4,4'-dimethoxy benzophenone. The mold was then irradiated with twelve 40-watt Westinghouse fluorescent daylight lamps. Six of these were placed above the mold, 12 inches away from the top plate and the other six were placed below the same distance away from the bottom plate. Exposure was continued for 38 hours. The polymerization was found to be essentially complete, at the end of this period, and thereafter the mold was heated for 24 additional hours at a temperature of 120° C. in an air oven. The finished polymer sheet was then removed from the mold for comparative purposes.

*Example 4*

A 9 inch by 9 inch mold, prepared by spacing two glass plates ⅛ inch apart, was filled with the methyl α-chloroacrylate monomer, as in the examples given above, except that the additive in this case was 0.01% by weight of benzoyl resorcinol. This latter compound is a good absorber of light having a wave length of about 4,000 A. This mold was irradiated by two 40-watt Westinghouse fluorescent sun lamps, one placed on each side of the mold at a distance of 12 inches. The exposure period was 38½ hours. Thereafter the product was heated in the mold for 24 additional hours at 120° C. as in the case of Example 3.

The sheets produced according to Examples 3 and 4 both showed excellent light stability and both were free of the strain marks which frequently characterize polymers of this type. Moreover, they could be reformed, e.g., by heating and curving them, without destroying the smooth optical surface. By contrast, a methyl α-chloroacrylate polymer not containing the ultra-violet absorbers shows gradual deterioration on exposure to sunlight. The untreated polymer has much better stability to color change than many polymeric materials, for example, polyvinyl chloride, but it does yellow and darken slightly on long exposure. For example, after year exposure to the sun in Florida the darkening of untreated methyl α-chloroacrylate polymer sheets is very noticeable. The material also takes on a distinct yellow tinge. As a rule, after 400 hours exposure in a fadeometer, such as the standard Atlas Fade-Ometer, the darkening also becomes quite evident, especially when the sample is viewed edgewise. By contrast, the polymer obtained by polymerizing with one of the ultra-violet absorbers in the examples given above possesses greatly enhanced color stability. The original polymer sheet, in these cases, had a very light yellow tinge due, apparently, to the presence of the ultra-violet absorber itself. However, this color was very stable and remained unchanged after 400 hours, and no color change could be detected, even when the sample was viewed edgewise. For use in military plane canopies or other transparent windows or panels, color stability is highly important, since planes of this type are exposed continuously to severe weather conditions in all parts of the world. Yellowing of the canopies would seriously affect visibility, particularly at twilight, and cannot be tolerated.

In the polymerization of materials of this type, which contain an effective ultra-violet absorber, it may be found that the ultra-violet absorber itself tends to slow down polymerization to an excessive degree. It is desirable, therefore, in some cases at least, to expose the material to a light which also contains some radiation somewhat longer than ultra-violet. However, it should also contain the ultra-violet form of radiation which is more effective to the extent that it can penetrate the monomer. The use of the ultra-violet absorber, even in very small quantities, gives a control over the process which has not been obtained so effectively by other means. It slows the process considerably but, unless excessive quantities of the absorber are used, does not stop it altogether. Thus, exposure to sunlight or to daylight type lamps which are high in ultra-violet but also contain some visible radiation is an effective way of carrying out the polymerization.

It will be understood that various additives conventionally added to polymers of this type may be employed in the usual manner. Thus small amounts of mold parting agents such as siloxane polymers may be employed as indicated in one of the examples given above. Other materials may be employed consistent with the qualities and purposes of the product. It will be understood, also, that these and other variations such as would occur to those skilled in the art may be employed without departing from the spirit of the present invention and it is intended by the claims which follow to cover such as far as the prior art properly permits.

What is claimed is:

1. The process of preparing transparent polymeric methyl α-chloroacrylate sheets which are substantially strain-free and light stable, which comprises adding to the monomeric acrylate 0.01 to 0.25% by weight of a hydroxy benzophenone compound selected from the group consisting of benzoyl resorcinol, 2,2'-dihydroxy-4,4'-dimethoxy benzophenone, 2,2'-dihydroxy-4,4' - diethoxyphenzophenone, 2,2',4,4'-tetra-hydroxy benzophenone, 2,2',4-trihydroxy-4'-methoxy benzophenone, 2,2',4 - trihydroxy - 4'-ethoxy benzophenone, 2 hydroxy-4-methoxy and 2 hydroxy-4-ethoxy benzophenone as a ultra-violet absorber, placing the monomer with additive in a mold, and then polymerizing the monomer by exposure to light which includes ultra-violet radiation and longer wave radiation for a period of time sufficient to produce a strong plastic sheet.

2. Process according to claim 1 wherein the benzophenone is 2,2',4,4'-tetrahydroxy benzophenone.

3. Process according to claim 1 wherein the benzo phenone compound is benzoyl resorcinol.

4. Process according to claim 1 wherein the benzophenone compound is 2,2',4-trihydroxy-4'-methoxy benzophenone.

5. Process according to claim 1 wherein the benzophenone compound is 2-hydroxy-4-methoxy benzophenone.

6. A polymeric sheet produced according to the process of claim 1.

7. A polymeric sheet produced according to the process of claim 2.

8. A polymeric sheet produced according to the process of claim 3.

9. A polymeric sheet produced according to the process of claim 4.

10. A polymeric sheet produced according to the process of claim 5.

11. A method of producing a transparent strain-free and color-stable polymeric sheet of methyl α-chloroacrylate, which comprises adding to the chloroacrylate monomer a small amount of a mold release agent and a small amount, less than 0.25%, of 2,2'-dihydroxy-4,4'-dimethoxybenzophenone, placing the mixture in a mold, exposing to light which includes ultra-violet and longer radiation until polymerization is essentially complete, and removing the sheet from the mold.

12. A polymeric sheet produced according to the process of claim 11.

References Cited
UNITED STATES PATENTS

| | | | |
|---|---|---|---|
| 2,576,821 | 11/1951 | Barnes | 260—78.5 |
| 2,930,776 | 3/1960 | Lundberg | 260—45.95 X |

DONALD E. CZAJA, *Primary Examiner.*

LEON J. BERCOVITZ, *Examiner.*

M. J. WELSH, *Assistant Examiner.*